(12) United States Patent
Young et al.

(10) Patent No.: US 6,408,717 B1
(45) Date of Patent: Jun. 25, 2002

(54) TWIN MASS FLYWHEELS

(75) Inventors: Alastair John Young, Kenilworth; Robert John Murphy, Leamington Spa, both of (GB)

(73) Assignee: AP TMF Limited, Leamington Spa (GB)

( * ) Notice: Subject to any disclaimer, the term of this patent is extended or adjusted under 35 U.S.C. 154(b) by 0 days.

(21) Appl. No.: 09/214,232

(22) PCT Filed: May 8, 1998

(86) PCT No.: PCT/GB98/01334

§ 371 (c)(1),
(2), (4) Date: May 14, 1999

(87) PCT Pub. No.: WO98/51940

PCT Pub. Date: Nov. 19, 1998

(30) Foreign Application Priority Data

| May 9, 1997 | (GB) | ................................................. 9709436 |
| Jul. 18, 1997 | (GB) | ................................................. 9715027 |

(51) Int. Cl.⁷ .......................... F16F 15/10; F16D 23/00; F16D 3/12; F16D 3/14; F16D 3/52
(52) U.S. Cl. ............................ 74/574; 74/572; 464/68; 192/30 V
(58) Field of Search ...................... 74/572–574; 464/3, 464/68, 66; 192/30 V, 106.1

(56) References Cited

U.S. PATENT DOCUMENTS

| 4,800,996 | A | * | 1/1989 | Loizeau | ................... 192/106.1 |
| 5,557,984 | A | * | 9/1996 | Cooke et al. | ................... 74/574 |
| 5,697,845 | A | * | 12/1997 | Curtis | ........................... 464/3 |
| 5,848,938 | A | * | 12/1998 | Curtis et al. | ................... 464/66 |
| 5,941,134 | A | * | 8/1999 | Cooke et al. | ................... 74/574 |
| 6,012,355 | A | * | 1/2000 | Sudau | ...................... 74/572 X |
| 6,029,539 | A | * | 2/2000 | Young | .......................... 74/574 |
| 6,041,678 | A | * | 3/2000 | Cooke et al. | ................... 74/574 |

* cited by examiner

*Primary Examiner*—Vinh T. Luong
(74) *Attorney, Agent, or Firm*—Paul E Milliken; Ray L Weber

(57) ABSTRACT

A twin mass flywheel (10) in which first (11) and second (12) flywheel masses can rotate relative to each other about an axis (C) under the control of one or more connection means (50, 31, 41) whose center of gravity moves radially with respect to the rotation axis as the flywheel masses rotate relative to each other. The centripetal loads acting on the connection means (50, 31, 41) as the twin mass flywheel rotates, tend to bias the first and second flywheel masses towards a pre-determined relative rotational position to provide speed sensitive damping of the relative rotation. The connection means may take the form of a mass (50) which moves along a first track (31) associated with the first flywheel mass (11) and a torque transmitting connection acting between the mass (50) and the second flywheel mass (12) in the form of a second track (41) also followed by the mass (50). Numerous other forms of connection means are also disclosed some of which us links (570) in place of one of the tracks.

18 Claims, 14 Drawing Sheets

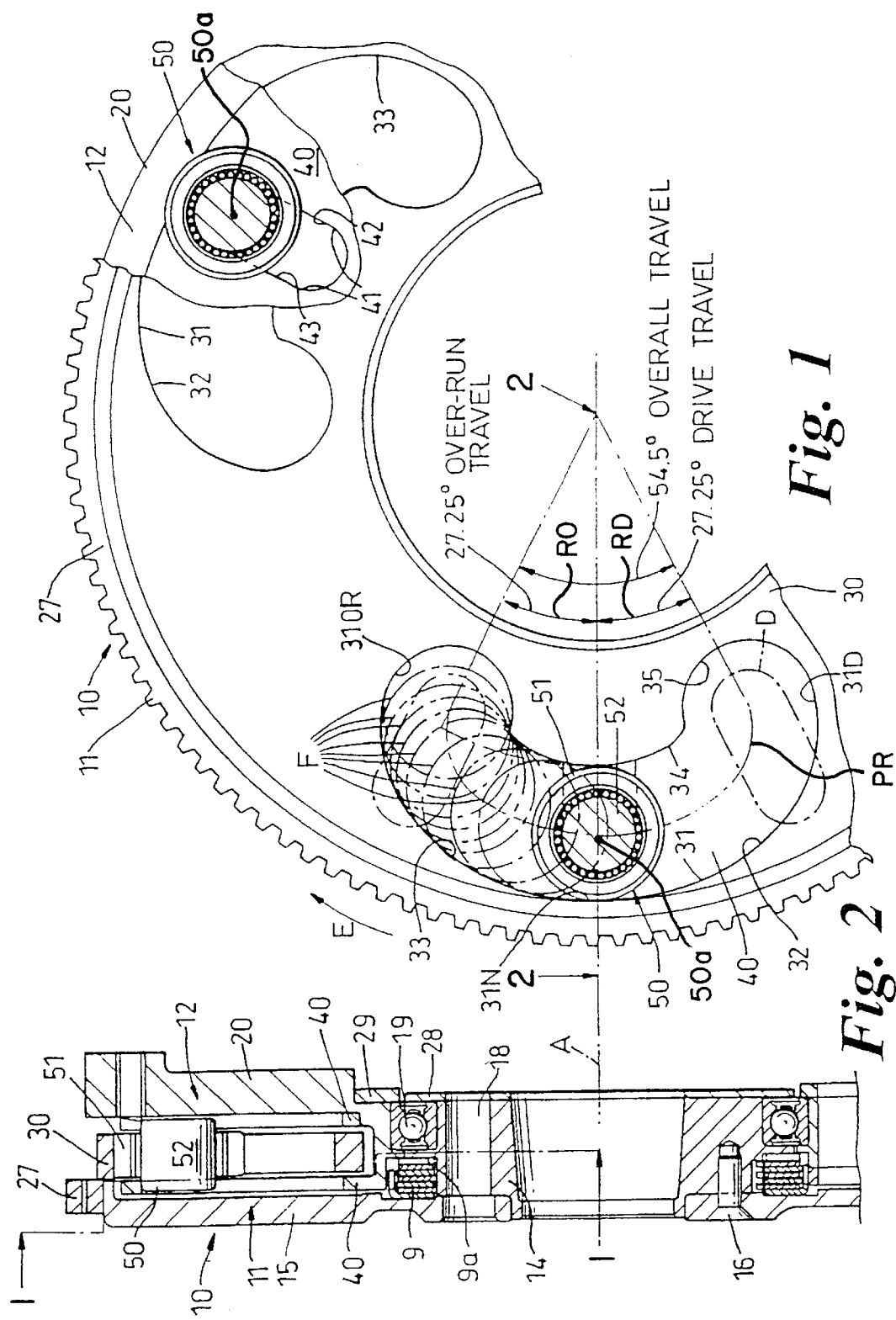

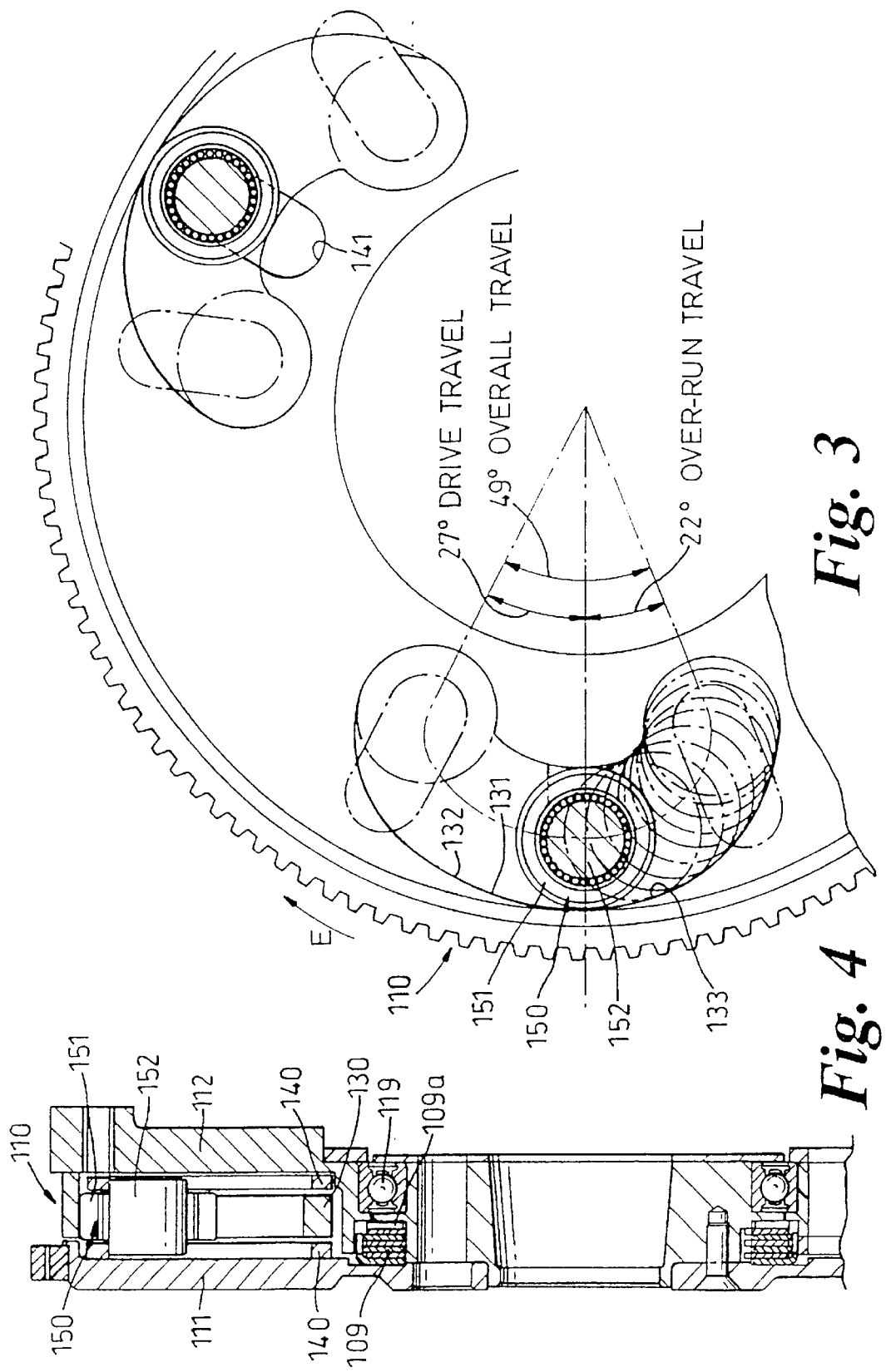

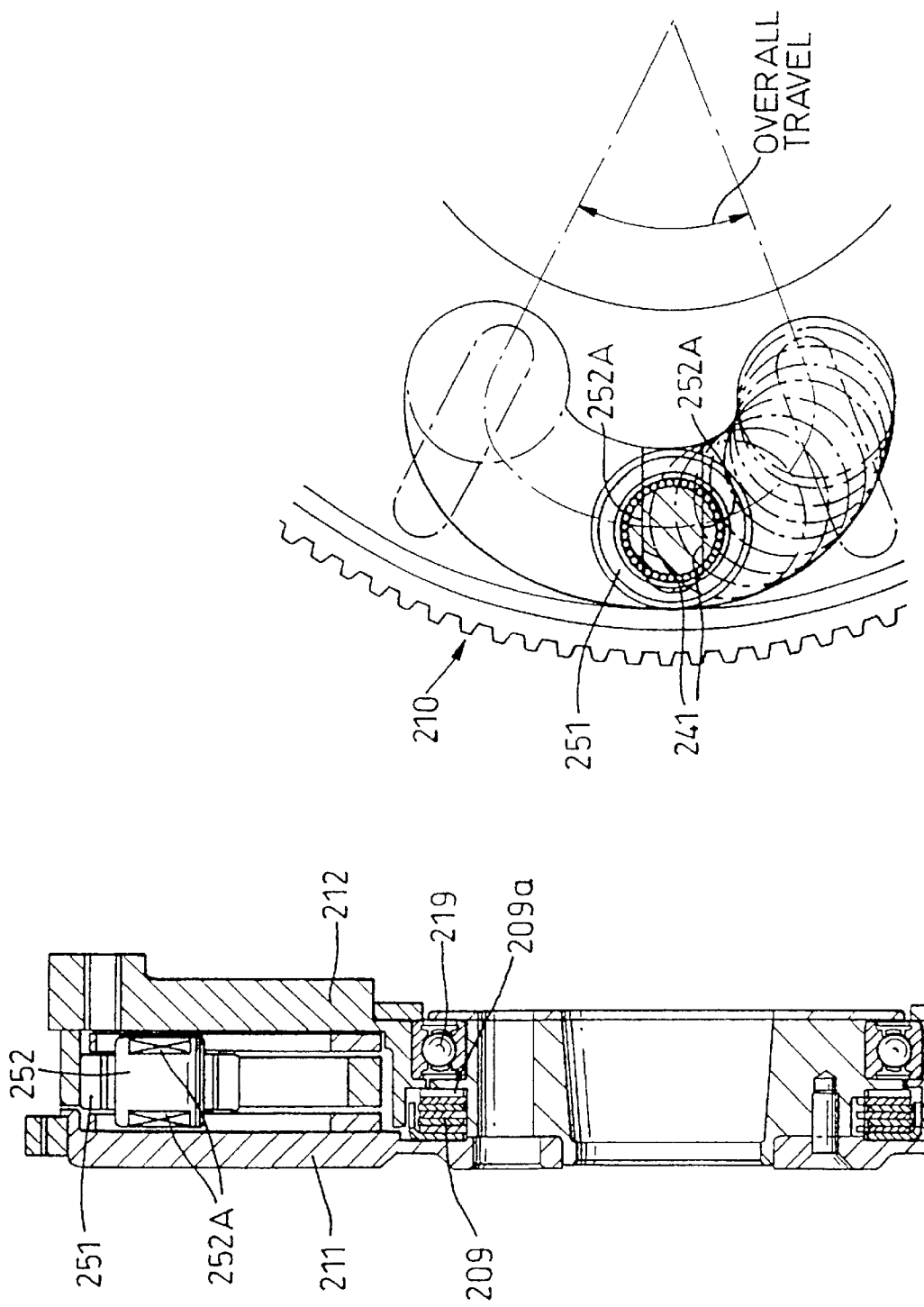

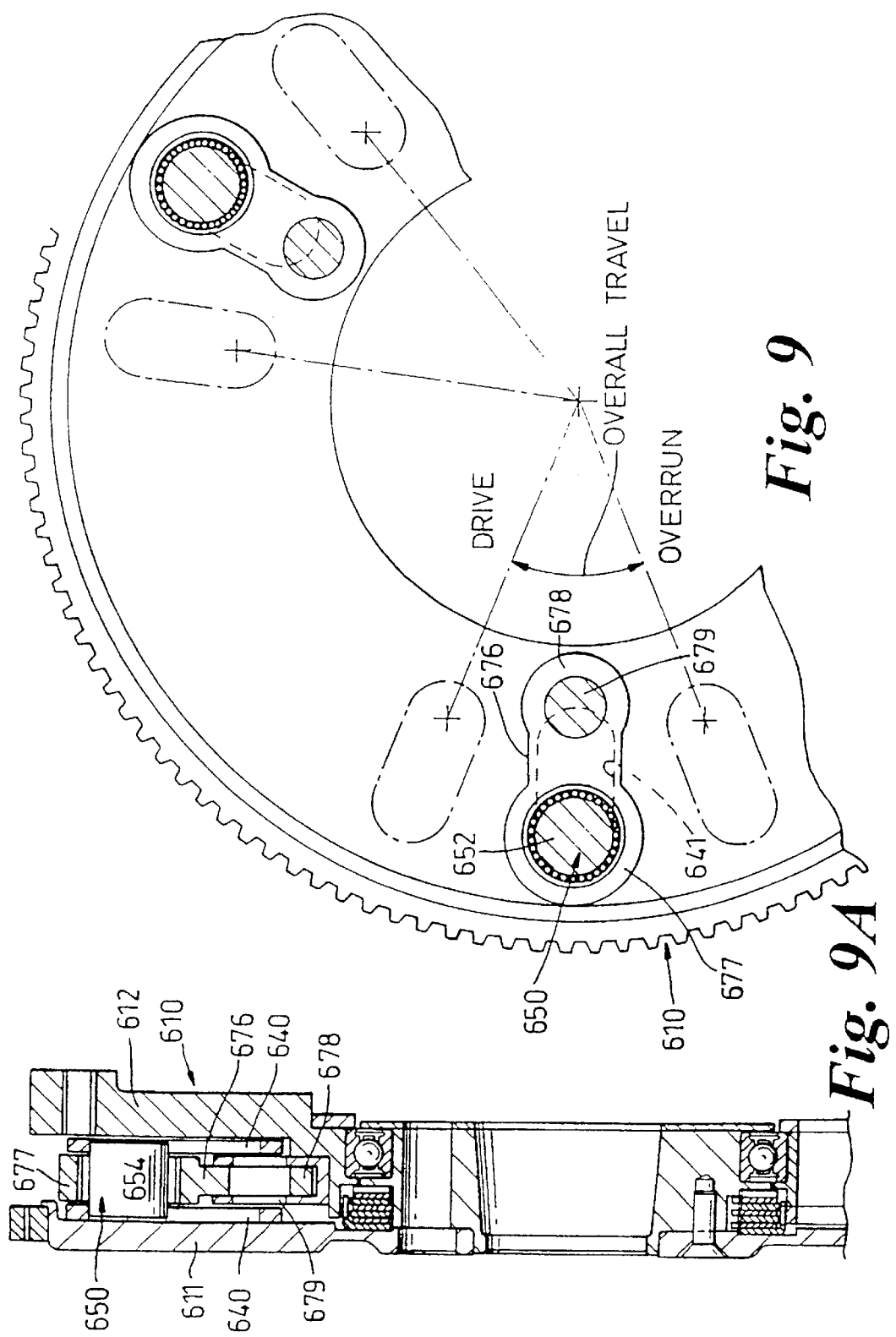

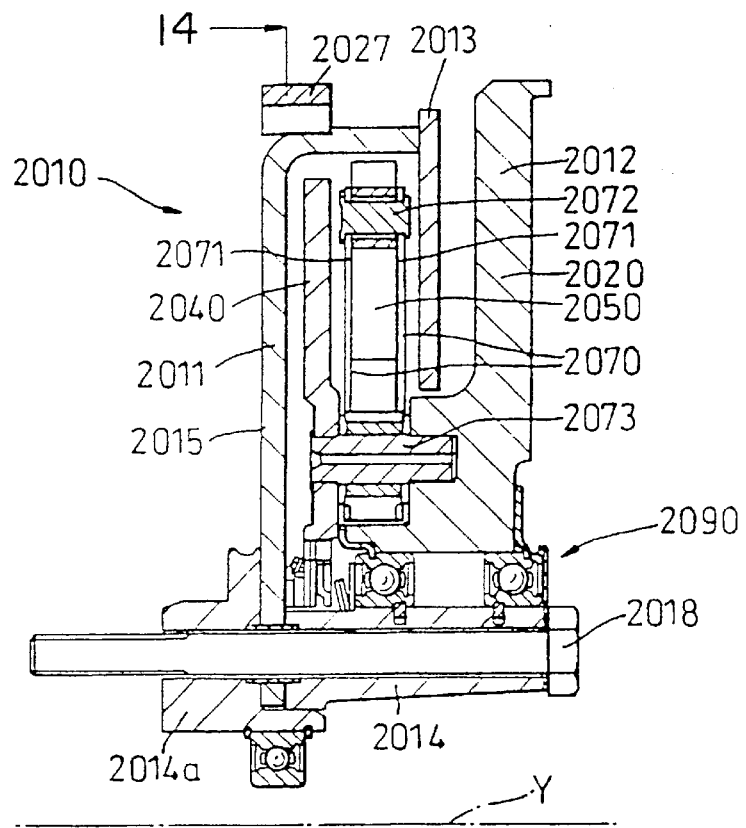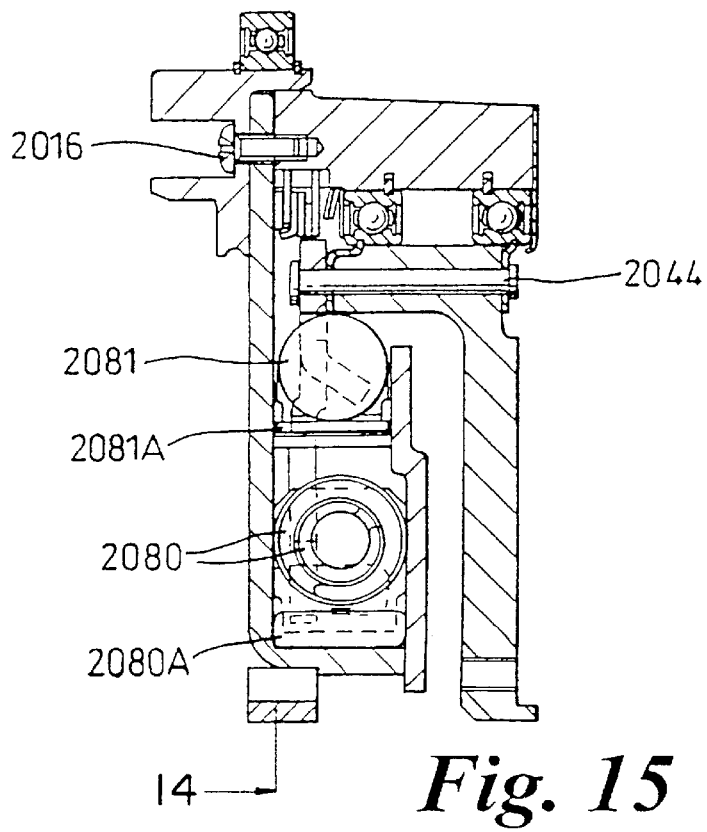
Fig. 15

TWIN MASS FLYWHEELS

FIELD OF THE INVENTION

The present invention relates to torsion vibration dampers and in particular, torsion vibration dampers for use as twin mass flywheels in land vehicles.

BACKGROUND OF THE INVENTION

Known twin mass flywheels include an input flywheel and an output flywheel which can rotate relative to each other about an axis to transmit power from an engine to a transmission and reduce torque fluctuations. Relative rotation of the flywheel masses is resisted by some form of damper means which is speed dependent. Example of such flywheels are disclosed in, for example, the Applicant's earlier patent GB 2229793B.

BRIEF SUMMARY OF THE INVENTION

It is an object of the present invention to provide a twin mass flywheel which includes an improved form of speed sensitive damper means.

Thus according to the present invention there is provided a twin mass flywheel comprising a first and second flywheel mass which can rotate relative to each other about an axis, the relative rotation being controlled by damper means including one or more connection means in which the centre of gravity of each connection means moves radially with respect to the axis as the first and second flywheel masses rotate relative to each other and the centripetal loads acting on the connection means as the twin mass flywheel rotates tend to bias the first and second flywheel masses towards a pre-determined relative rotational zone.

In a preferred arrangement at least one connection means consists of a mass capable of movement along a first track associated with the first flywheel mass and a torque transmitting connection acting between the mass and the second flywheel mass.

The mass may be capable of movement along a pair of first tracks associated with the first flywheel mass and a torque transmitting connection acting between the mass and the second flywheel mass.

The invention also provides a twin mass flywheel comprising first and second flywheel masses which can rotate relative to each other about an axis, the relative rotation being controlled by one or more connection means in which the centre of gravity of each connection means moves radially with respect to the axis as the first and second flywheel masses rotate relative to each other, the centripetal loads acting on the connection means as the twin mass flywheel rotates tending to bias the first and second flywheel masses towards a pre-determined relative rotational zone, and the or each connection means comprises a mass capable of movement along a first track associated with the first flywheel mass and having a torque transmitting connection acting between the mass and the second flywheel mass via a second track on the second flywheel mass.

The invention further provides a twin mass flywheel comprising a first and second flywheel mass which can rotate relative to each other about an axis, the relative rotation being controlled by one or more connection means in which the centre of gravity of each connection means moves radially with respect to the axis as the first and second flywheel masses rotate relative to each other, the centripetal loads acting on the connection means as the twin mass flywheel rotates tending to bias the first and second flywheel masses towards a pre-determined relative rotational zone, and the or each connection comprises a mass capable of movement along a first track associated with the first flywheel mass and a torque transmitting connection acting between the mass and the second flywheel mass via a link which is pivotally connected at one end to the mass and at the other end to the second flywheel mass.

The invention still further provides a twin mass flywheel comprising a first and second flywheel mass which can rotate relative to each other about an axis, the relative rotation being controlled by one or more connection means in which the centre of gravity of each connection means moves radially with respect to the axis as the first and second flywheel masses rotate relative to each other, the centripetal loads acting on the connection means as the twin mass flywheel rotates tending to bias the first and second flywheel masses towards a pre-determined relative rotational zone, and the or each connection means comprises a mass including a first track along which a follower associated with the first flywheel mass moves and a torque transmitting connection acting between the mass and the second flywheel mass.

BRIEF DESCRIPTION OF THE SEVERAL VIEWS OF THE DRAWING

The invention shall now be described, by way of example only, with reference to the accompanying drawings in which:

FIG. 1 is an axial view of a twin mass flywheel taken in the direction of arrow 1—1 of FIG. 2;

FIG. 2 is a sectional view taken along the line 2—2 of FIG. 1;

FIGS. 3 and 4, 5 and 5A are equivalent views to FIGS. 1 and 2 of a second and third embodiment of the invention;

FIGS. 8 and 8A, 9 and 9A, are equivalent views to FIGS. 1 and 2 of a fifth and sixth embodiment of the invention;.

FIG. 15 is a sectional view taken along the line 15—15 of FIG. 14;

DETAILED DESCRIPTION OF THE INVENTION

Figure 6:
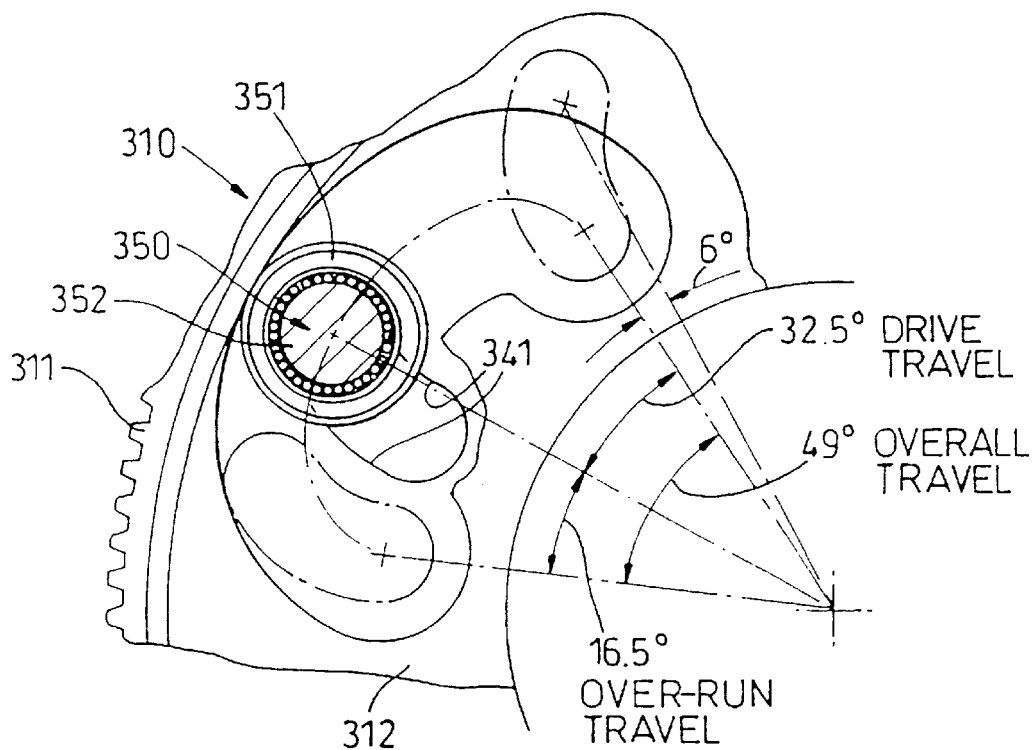
FIG. 6 is an axial view of a fourth embodiment of the invention.

With reference to FIGS. 1 and 2 there is illustrated a twin mass flywheel 10 which is formed from two flywheel masses 11 and 12.

One flywheel mass 11 (also known as an input flywheel mass) is fixed to a crankshaft (not shown) of an internal combustion engine by way of a central hub 14 and bolts (not shown) which pass through holes 18. In use a friction clutch (not shown) is secured to the second flywheel mass 12 (also known as an output flywheel mass) to connect the second flywheel mass with an associated gearbox (not shown).

Under normal drive conditions and over-run conditions the twin mass flywheel 10 as a whole rotates in a clockwise direction in the view shown in FIG. 1 as indicated by arrow E about axis A.

The flywheel mass 11 comprises the central hub 14, an input plate 15, a central plate 30 and a starter ring 27 which is welded to the input plate 15. Central plate 30 is secured at its outer periphery to input plate 15. An inner bearing retaining plate 28 is fixed to the hub 14 by rivets (not shown) to retain a bearing 19 on which second flywheel mass 12 is mounted. Main input plate 15 is fixed to hub 14 by screws 16 prior to assembly onto the engine, and then also by the main bolts through holes 18.

The second flywheel mass 12 comprises an output plate 20 with an outer bearing retaining plate 29 and two side plates 40 both fixed rotationally fast with the output plate 20.

Three circumferentially equispaced masses 50 (only two shown) are located between side plates 40 and transmit torque between the side plates 40 and central plate 30.

Friction damper 9 assists in controlling relative rotation of the flywheel masses 11 and 12 and consists of a pack of interleaved friction discs which are alternatively splined rotationally fast with flywheel mass 11 and flywheel mass 12 respectively and which are axially biased into frictional contact by a belleville spring 9a.

Central plate 30 is generally annular in shape and has three circumferentially equi-spaced first track surfaces 31. Each track surface has a curved profile PR with opposite ends 31D, 31OR of the track being at a smaller radius than the middle portion 31N of the track. Each track has a drive portion 32 and an over-run portion 33. Each first track surface has a corresponding parallel guide surface 34.

Each side plate 40 is generally annular and has 3 equi-spaced radially orientated second track surfaces 41 in the form of slots. Each second track surface is associated with a corresponding first track surface 31 and has a drive portion 42 and an over-run portion 43.

Connecting means or mass 50 comprises an outer roller 51 rotationally connected to an inner roller in the form of a pin 52. Each first track 31 is contacted by the corresponding outer roller 51 and each second track 41 is contacted by the corresponding pin 52.

Operation of the twin mass flywheel is as follows:

With the twin mass flywheel rotating and transmitting zero torque, centripetal forces acting on each mass 50 tend to position it at a radially outermost position i.e. at the neutral position 31N as shown in FIG. 1 which is the radially outermost position of the track 31.

Under drive conditions i.e. transmission of power from the input flywheel to the output flywheel the central plate 30 tends to rotate clockwise as viewing FIG. 1 relative to the side plates 40 as indicated by drive travel range RD in FIG. 1.

This relative rotation causes the first track 31 to move circumferentially relative to the roller 51 of the mass 50. The roller 51 rolls on the first track and is forced radially inwards by the profile of the drive portion 32 of the first track. As the mass 50 moves radially inwards the pin 52 can roll on the second track 41 (slot) and in particular on the drive portion 42. As the mass moves relative to the first track, the first track produces a component of force acting on the roller 51 in the circumferential direction. This circumferentially acting force is transferred to the pin 52 and then via the drive portion 42 of the second track to the output flywheel 12.

With the flywheel 10 rotating at a specific speed as the drive torque increases the mass 50 will move further around the first track drive portion 32

Under conditions of high torque and low flywheel rotational speed the roller 51 can reach the drive stop abutment 35 of the first track 31 and further relative rotation of the flywheel mass ceases (at this condition the position of the second track 41 relative to the first track 31 will be as shown chain dotted at D of FIG. 1).

Under over-run conditions i.e. transmission of power from the output flywheel 12 to the input flywheel 11 the effects are similar except the side plates 40 tend to rotate clockwise (when viewing FIG. 1) relative to the central plate 30 and the mass 50 moves towards the over-run end 31OR of the first track 31 (successive over-run positions of the mass relative to the first track are shown at F of FIG. 1). The over-run travel range is shown as RO in FIG. 1.

The guide track 34 is useful to ensure that when the flywheel moves quickly from a drive condition to an over-run condition or vice versa the roller 51 stays in contact with the first track surface 31.

As the first and second flywheel masses (11,12) rotate relative to each other, the centripetal loads acting on the connection means 50 as the twin mass flywheel 10 rotates, tending to bias the first and second flywheel masses (11,12) towards a pre-determined rotational zone or position determined by the size and location of the tracks 31 and 41, thus damping the torsional vibrations between the engine and transmission.

It should be noted that the masses 50 are rotationally fast with the output flywheel 12 since they are confined by the second track 41 to move in a radial direction only with respect to the output flywheel mass 12. This means that, as the radial position of the masses varies, the rotational inertia of the output flywheel 12 varies and this can be advantageous in some circumstances. Note also that no such variation in rotational inertia occurs with the input flywheel mass 11 so that any effect on the operation of the engine connected directly with the mass 11 is minimized.

Thus in this case the center of gravity 50a of each connection means 50 moves circumferentially to a greater extent relative to the input flywheel mass than the output flywheel mass.

Also the amount of travel in the drive direction (27.25 degrees) is equal to the over-run travel (27.25 degrees).

The twin mass flywheel of FIGS. 1 and 2 has fewer parts than that shown in GB 2229793B since it has no connecting links etc. Also each mass 50 is fully effective (and therefore provides better damping at lower speeds of rotation) since it is all positioned at a large radius from the axis A whereas in GB 2229793B part of each mass acts to connect the mass to its associated flywheel mass and is therefore located at a smaller radius. It is also possible with the design of FIGS. 1 and 2 to achieve a connection between the flywheel masses which, for the same range of relative rotation between the flywheel masses, has a smaller circumferential extent. That is, the circumferential extent of track 31 can be made less than the space occupied by the weights and associated linkage of GB 2229793B.

Figure 19:
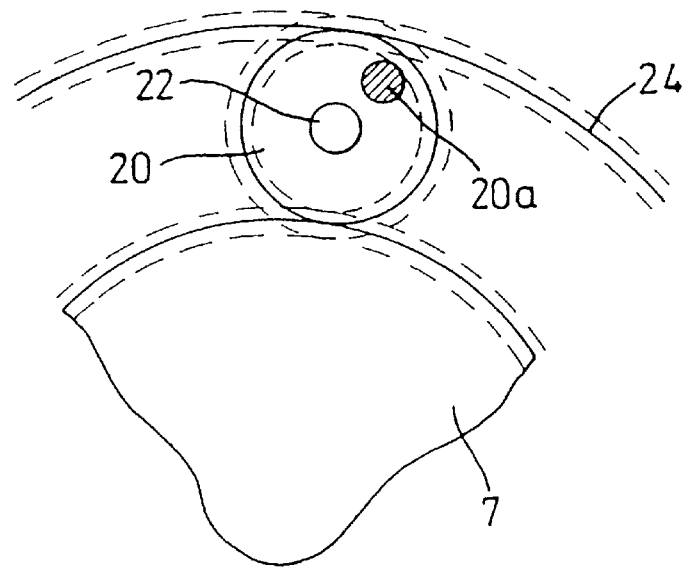

In further embodiments it is possible to have the first track 31 and mating surface of roller 51 with an engaging toothed profile so that no slippage occurs between roller 51 and first track 31. In this case the guide track 34 would have to be of a smooth profile. Furthermore with such a geared roller 51 rotating about its own rolling center (i.e. the axis of pin 52) the center of gravity of the roller 51 need not be at its rolling center. Thus the center of gravity of the roller could be positioned radially outboard of its rolling center when the twin mass flywheel was in the neutral position and as the twin mass flywheel rotated relative to each other the centre of gravity of the roller would move in faster than the rolling center of the roller (i.e. axis of pin 52). In fact it is not even necessary for the rolling center of the roller 51 to move radially at all in order for the center of gravity to move radially. Thus, for example, in British patent application GB 2285109A one or more of the planet wheels 20 (see FIG. 19) in any of the embodiments could have a center of gravity offset from their rotation centres (eg the axes of pins 22) by the inclusion, for example, of additional off-set masses 20a on each planet wheel. In such a modified arrangement as the twin mass flywheel is rotated the flywheel masses 1 and 2 will be biased towards a predetermined position by the planet wheels 20.

Figure 20:
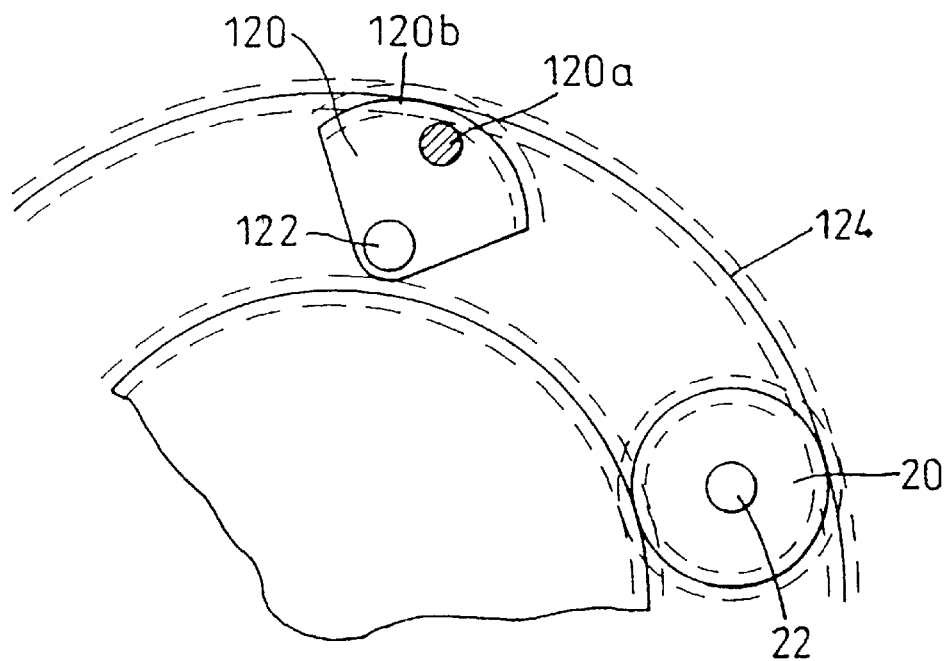

FIG. 20 shows a further alternative form of the construction disclosed in GB 2285109A in which one or more of the planet wheels 20 is replaced by a toothed quadrant 120 which is pivotted on a pin 122 (equivalent to pins 22) and which has a peripheral arc of teeth 120b which mesh with ring gear 124. These quadrants may also include offset masses 120a which ensure that the quadrants bias the flywheel masses 1 and 2 towards a predetermined position. Typically three equally circumferentially spaced planet wheels 20 would be used with three quadrants 120 spaced circumferentially between the planet wheels.

FIGS. 3 and 4 show a second embodiment of a twin mass flywheel 110 according to the present invention in which features which perform substantially the same function as those in twin mass flywheel 10 are labelled 100 greater.

In this case the side plates 140 are rotationally fast with the input flywheel 111 and the central plate 130 is rotationally secured at its outer periphery to the output flywheel 112. Thus in this case the rotational inertia of the input flywheel varies and the rotational inertia of the output flywheel is fixed because the center of gravity of each connection means moves circumferentially to a greater extent relative to the output flywheel mass than the input flywheel mass.

Furthermore the over-run portion 133 of the first track surface 131 has a different profile to the drive portion 132 resulting in a different total drive travel (27 degrees) from over-run travel (22 degrees). In this case at the end of the drive and over-run travel the mass has moved radially in by the same amount but in further examples the mass could move radially by different amounts at the limit of drive and over-run travel. Thus the design of FIGS. 3 and 4 has the additional advantages over the construction shown in GB 2229793B that the flywheel characteristics can easily be made different in the drive and over-run conditions.

FIGS. 5 and 5A shows a third embodiment of a twin mass flywheel 210 in which features which perform the same function as those in twin mass flywheel 110 are labelled 100 greater.

Twin mass flywheel 210 is similar to twin mass flywheel 110 except pin 252 has flat surfaces 252A which contact and slide on the second track 241. This results in a frictional sliding force proportional to the torque being transmitted by the twin mass flywheel and such a varying frictional force can be advantageous in some installations.

FIG. 6 shows a fourth embodiment of a twin mass flywheel 310 in which features which perform the same function as those in twin mass flywheel 110 are labelled 200 greater.

Twin mass flywheel 310 is identical to twin mass flywheel 110 except the profile of the second track 341 has been modified. In this case the profile of the second track results in a greater drive travel (32.5 degrees) and a reduced over-run travel (16.5 degrees) when compared with twin mass flywheel 110. The total overall travel (49 degrees) is the same as twin mass flywheel 110.

Also, because of the profile of the second track, the mass 350 moves circumferentially relative to the input flywheel 311 but only by a relatively small amount (6 degrees) when compared with the circumferential movement of the mass relative to the output flywheel 312 (49 degrees). Thus since the second track is substantially radially orientated the mass 350 is substantially rotationally fast with the input flywheel 311 and therefore as the radius of the mass varies the rotational inertia of the input flywheel varies and the rotational inertia of the output flywheel 312 is substantially constant. The tracks 41, 141 could also be curved like track 341 to create or further increase the differences between the flywheel characteristics on drive and over-run.

Figure 7:
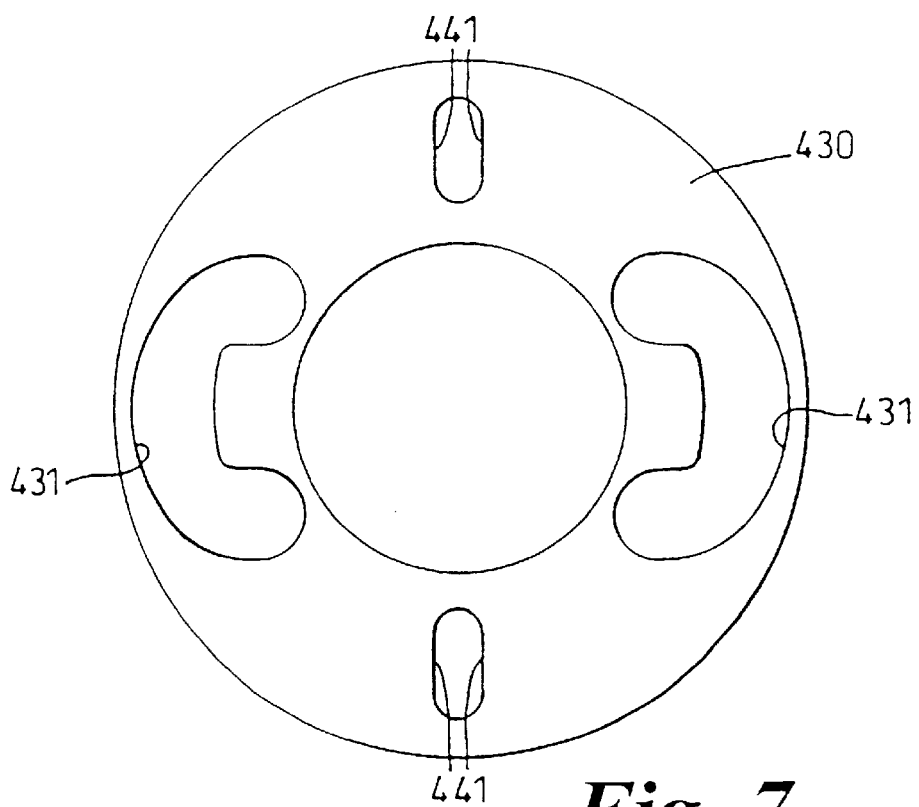
FIG. 7 shows a part of a modified twin mass flywheel;.

FIG. 7 shows a modified central plate 430 similar to central plate 30 except it contains two diametrically opposed curved first tracks 431 and two diametrically opposed second tracks in the form of slots 441. This central plate 430 can be used with appropriate masses and modified side plates which have appropriate slotted and curved tracks situated adjacent the curved first tracks 431 and slots 441 in place of central plate 30, side plates 40, and appropriate masses 50 of twin mass flywheel 10. In such an embodiment both the rotational inertias of the input and output flywheels would vary as they rotated relative each other.

Figure 8:
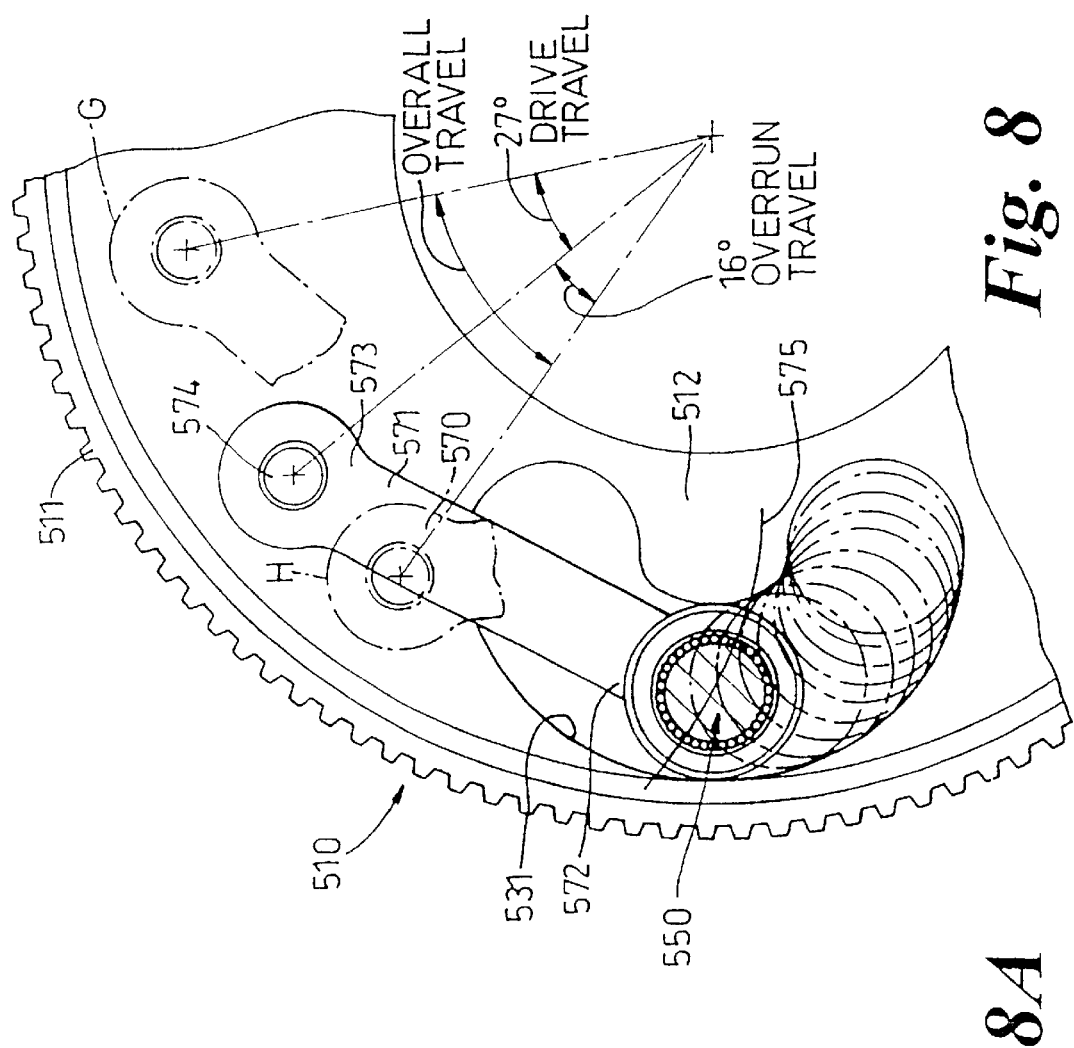
Figure 8A:
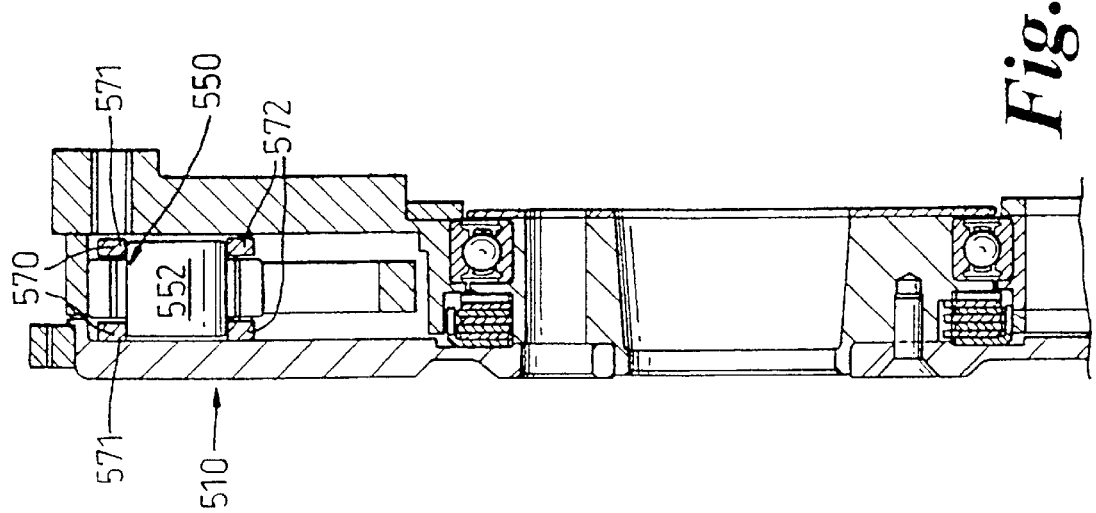

FIGS. 8 and 8A shows a fifth embodiment of a twin mass flywheel 510 according to the present invention in which features which perform substantially the same function as those in the twin mass flywheel 110 are labelled 400 greater.

In this case the side plates 40 have been replaced with a link 570 in the form of a pair of arms 571. One end 572 of each of the arms is fixed to the pin 552 and the other end 573 of each of the arms is pivotally connected via pivot 574 to the input flywheel 511. Thus mass 550 is constrained to move in an arc 575 about pivot 574. It is apparent that arc 575 is substantially radially orientated and as the mass 550 moves along the arc 575 the rotational inertia of the input flywheel 511 varies and substantially no variation in the rotational inertia of the output flywheel 512 occurs.

The full drive position and over-run position of the link relative to the output flywheel are shown chain dotted at G and H respectively and it can be seen that in this arrangement the drive travel (27 degrees) is greater than the over-run travel (16 degrees). This arrangement is a half-way house solution between a fully slot-guided arrangement as shown in FIGS. 1 to 7 and a fully link-guided arrangement as shown in GB 2229793B and provides close control of the mass 550 when the mass is at rest.

FIGS. 9 and 9A shows a sixth embodiment of a twin mass flywheel 610 according to the present invention in which features which perform substantially the same function as those in the twin mass flywheel 110 are labelled 500 greater.

In this case the central plate 130 and roller 151 has been replaced with a link 676. One radially outer end 677 of the link 676 is fixed to the pin 652 which moves in second track 641 in plates 640 connected with input flywheel 611 and the other radially inner end 678 of the link 677 is pivotally connected via pivot 679 to the output flywheel 612. In this case mass 650 is rotationally fast with the input flywheel 611 and the drive travel is equal to the over-run travel. This arrangement is also a half-way house solution between a fully slot-guided arrangement and the fully link-guided arrangement GB 2229793B.

The guide slots 641 could be curved, as per slots 341 in FIG. 6, to give different flywheel characteristics in the drive and over-run conditions. This use of curved guide slots also applies to slots 41, 141, 241, 741, 841, 2052 described herein.

The invention is not restricted to the mass rotating as it moves relative to the first or second track. For example, the roller 51 and pin 52 of twin mass flywheel 10 could be a unitary mass and a sliding movement would then occur between the unitary mass and the first or second track. Similarly, for example, the pin 350 could be made unitary with roller 351 so that sliding movement would take place between the mass and the appropriate first or second track.

The invention is not limited to a single mass per connection means or a single track per connection means for example twin mass flywheel 10 has two tracks, namely a first track 31 and a second track 41.

Figure 10:
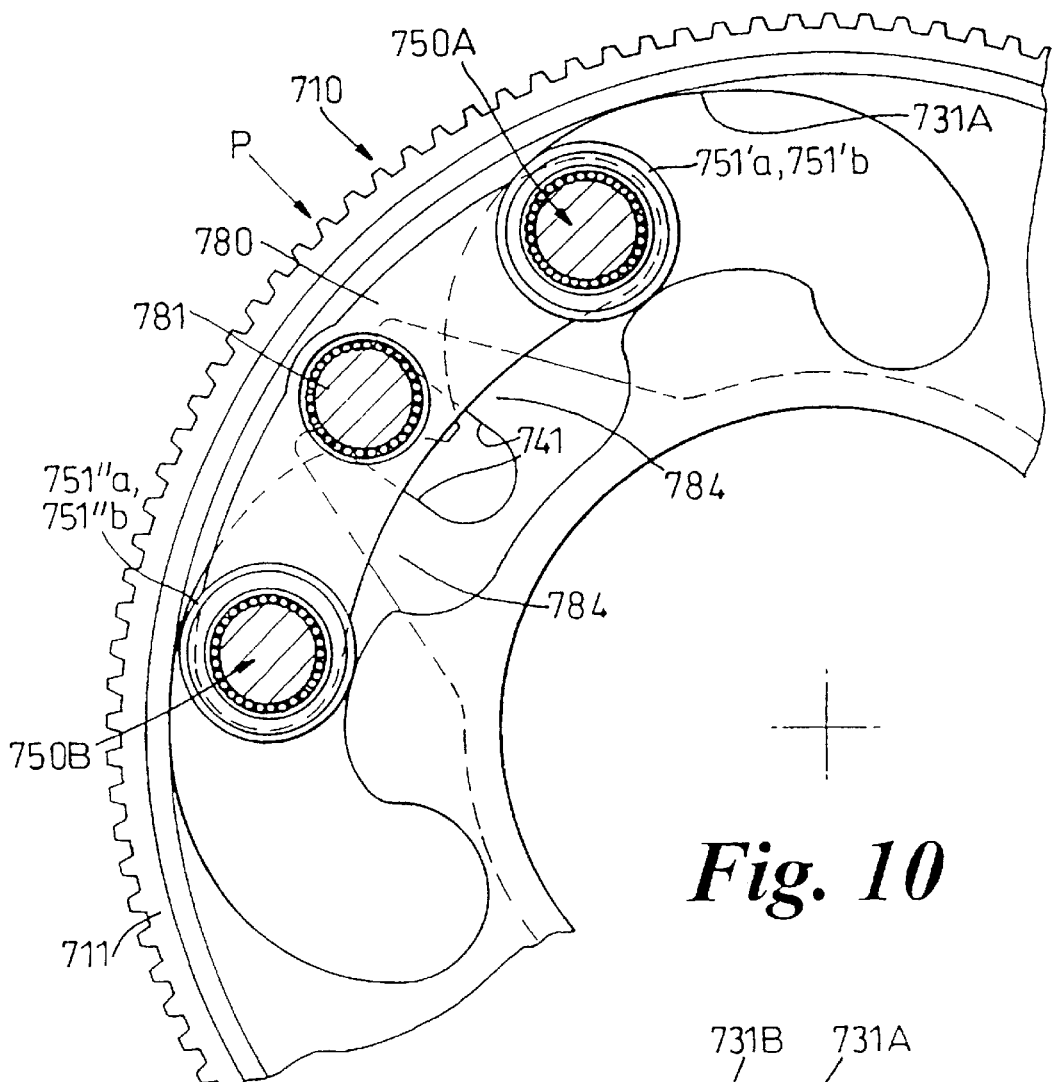
FIG. 10 is an axial view of a seventh embodiment of the invention.

It is possible for a connection means to have more than one connection point with either the input or output flywheel mass. For example, FIG. 10 shows a seventh embodiment of a twin mass flywheel in which two masses 750A, 750B each running on a pair of first tracks 731A, 731B with both tracks being connected to the input flywheel 711. Each mass 750A, 750B comprises a pair of rollers 751'a, 751'b,:751"a, 751"b which engage track 731A, 731B respectively. The masses are interconnected by a link 780. A pin 781 is situated in the middle portion of the link and used to transfer torque to the output flywheel 712 via a second track 741 in the form of a pair of forks 784 attached to the output flywheel. This arrangement enables a larger mass to be used (in effect masses 750A, 750B and link 780) which gives even better low speed damping.

Figure 10A:
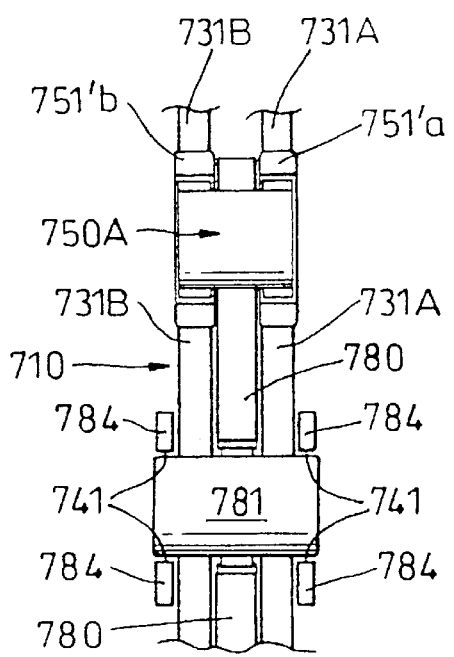
FIG. 10A is a partially cut away radial view of the twin mass flywheel 710 looking in the direction of arrow P of FIG. 10.

It will be appreciated the pairs of rollers 751'a,751'b and co-operating pair of tracks 731A, 731B of FIGS. 10, 10A could be used in place of the single roller 51 and co-operating track 31 of FIGS. 1 and 2 or any of the other single roller and track arrangements described above in relation, for example, to FIGS. 3, 4 or 5, 5A or 6 or 8, 8A.

Figure 11:
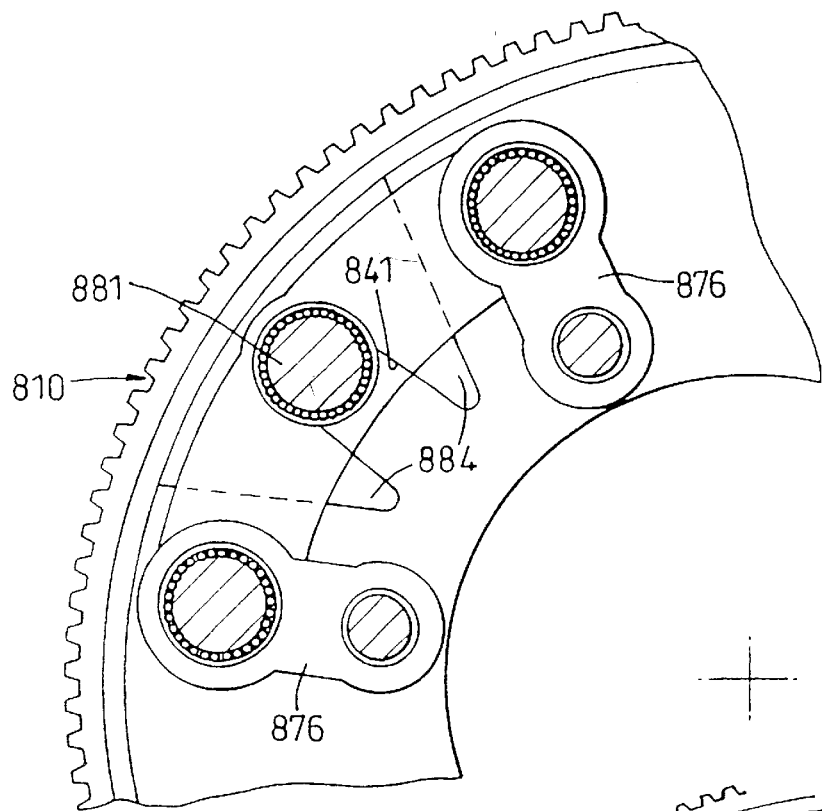
FIGS. 11 and 12 show axial views of eighth and ninth embodiments of the invention.

Similarly in the eighth embodiment of a twin mass flywheel 810 of FIG. 11 there are two connections with the output flywheel via links 876 and one connection with the input flywheel via forks 884 within which pin 881 moves. This again enables a larger mass to be used which provides better low speed damping.

For ease of explanation where a twin mass flywheel has one track connected to one flywheel and another track connected to another flywheel i.e. twin mass flywheels 10, 110, 210, 310, 710 the substantially radially orientated track has been described as a second track and the substantially circumferentially orientated track has been described as a first track. However for the purposes of the claims it is possible to interpret either track as a first track and the other track then becomes the second track.

Note that all the tracks on central plate 430 (FIG. 7) (a modified central plate 30) can be interpreted as first tracks and the corresponding tracks on a modified version (not shown) of side plates 40 can be interpreted as second tracks or vice versa.

Figure 12:
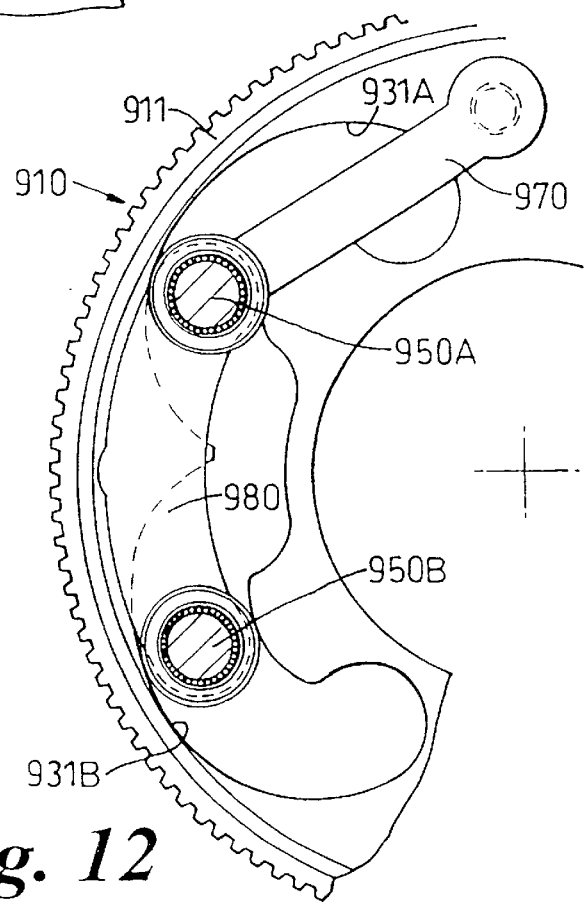

FIG. 12 shows a ninth embodiment of a twin mass flywheel 910. A first connection means comprises link 970, mass 950A and track 931A (which are equivalent to their counterparts 570, 550 and 531 respectively of twin mass flywheel 510). There is also an additional second connection means comprising link 980 mass 950B and track 931B (similar to their respective counterparts 780, 750B, and 731B of twin mass flywheel 710). This additional second connection means controls movement of the first connection means relative to the first and second flywheel masses and the center of gravity of the additional second connection means moves radially with respect to the axis of rotation of the twin mass flywheel as the first and second flywheel masses rotate relative to each other, and the centripetal loads acting on the additional second connection means, as the twin mass flywheel rotates, tend to bias the first and second flywheel masses to a predetermined relative rotational zone. Again this construction enables the use of a larger mass (in effect masses 950A, 950B and link 980) which increases the low speed damping of the flywheel.

In further embodiments it is possible to put one or more yet further connection means between the additional second connection means of FIG. 12 and the output flywheel i.e. it is possible to have a series of cascading connection means.

Figure 13:
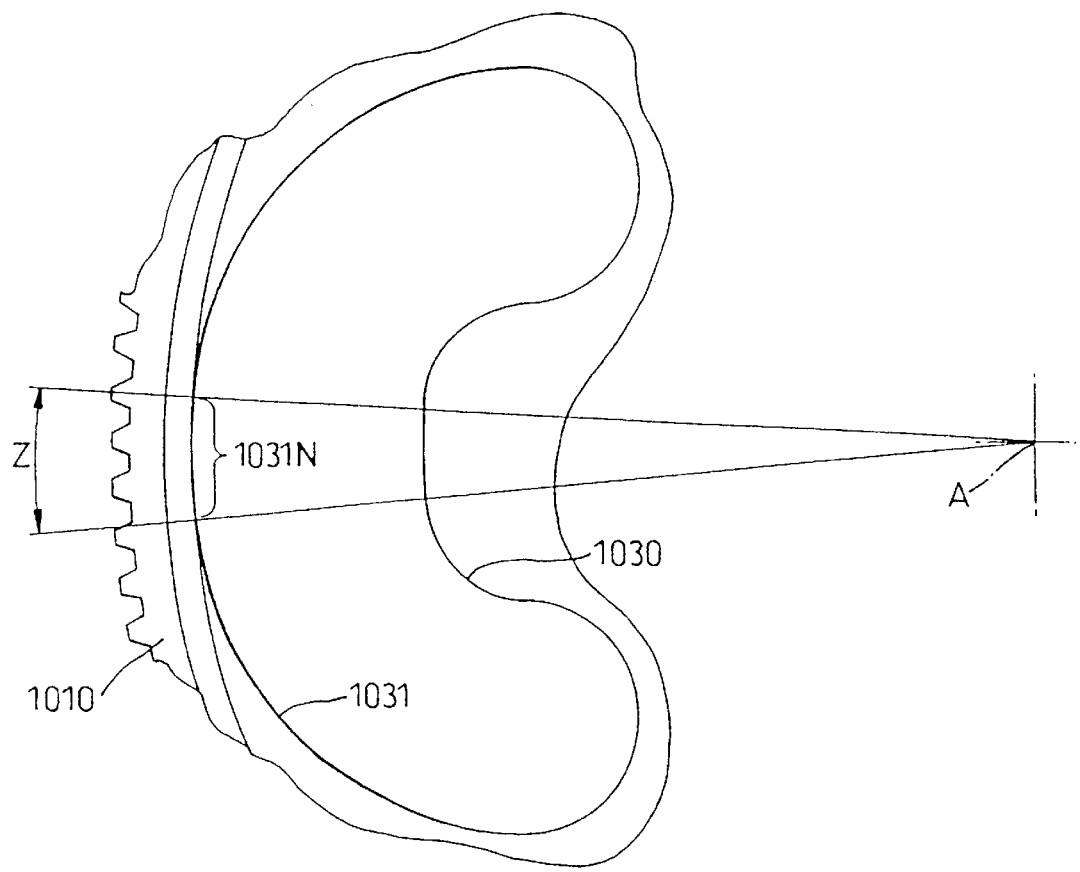
FIG. 13 shows a partial axial view of a modified twin mass flywheel 1010 similar to flywheel 1010 similar to the flywheel of FIG. 1.

FIG. 13 shows a partial view of a twin mass flywheel 1010 identical to twin mass flywheel 10 except the profile of the first track has been modified. In this case the central portion of the track (as indicated by the angle Z) is manufactured as a constant radius about the axis A. Thus with the twin mass flywheel rotating and transmitting zero torque, centrifugal forces acting on each mass (not shown) tend to position it at an indeterminate position but specifically within a zone indicated by neutral position 1031N. Relative rotation of the twin mass flywheel within this zone can be controlled if required by other means such as friction dampers, resilient means, viscous dampers, all of which are individually known in twin mass flywheels.

These other means of controlling relative rotation are applicable to any twin mass flywheel according to the present invention and can be operable over any range of relative rotation. Additionally the controlling means in the applicants British patents GB 2229793B and GB 2254906B, and pending international patent application No. PCT/GB95/01976 which are used in association with links are applicable to the embodiments of the present invention which also incorporate links. Furthermore resilient or friction controlling means can act between a part of the connection means and are the input or output flywheel mass to further control relative rotation of the flywheel masses.

Figure 14:
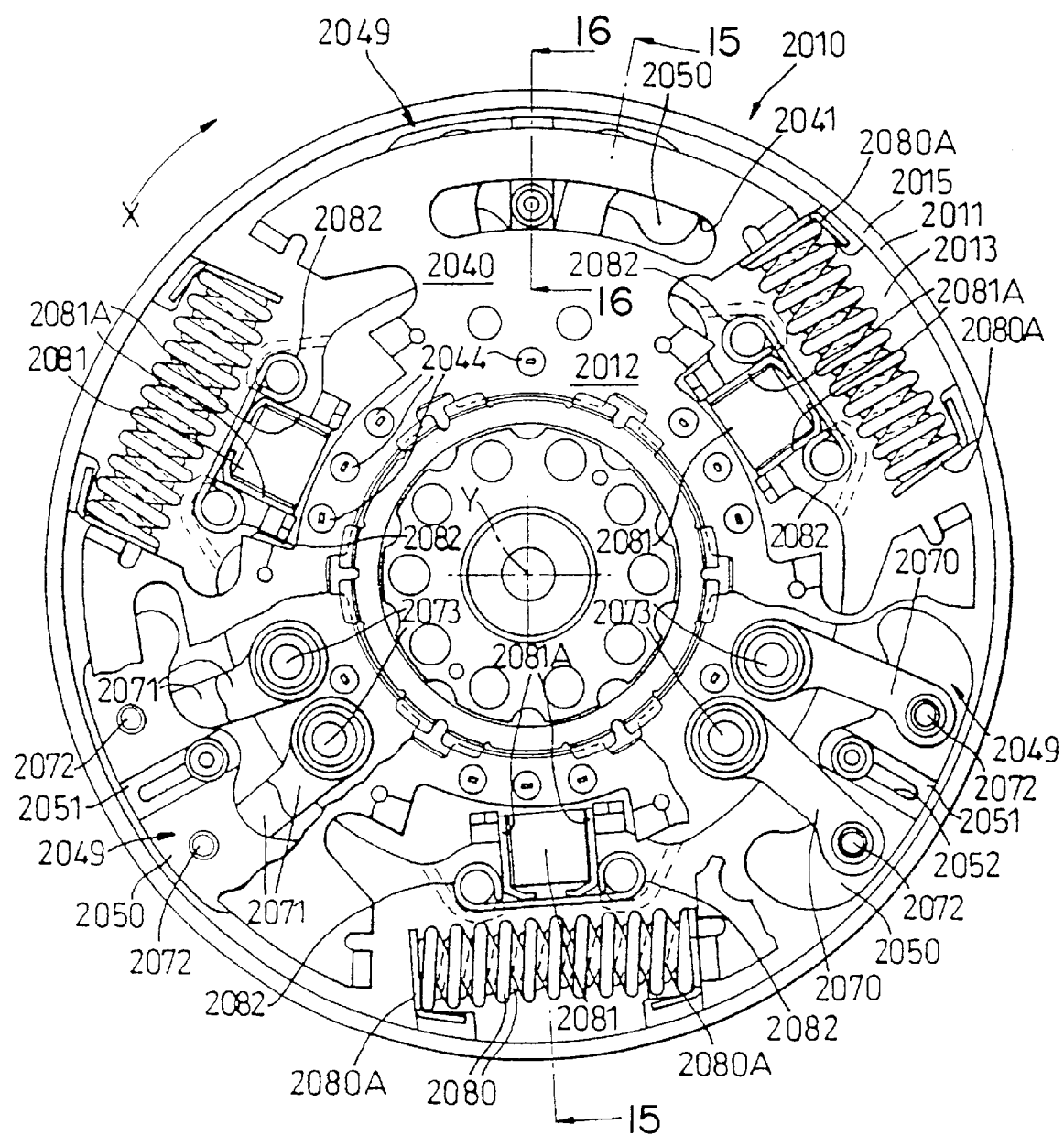
FIG. 14 is an axial partially cut away view of a tenth embodiment of the invention taken in the direction of arrow 14-4 of FIG. 15.

FIGS. 14 and 15 there show a twin mass flywheel 2010 which is formed from two flywheel masses 2011 and 2012.

One input flywheel mass 2011 is fixed to a crankshaft of an internal combustion engine (not shown) by way of a split centre hub 2014,2014a and bolts 2018. In use a friction clutch (not shown) is secured to the output flywheel mass 2012 to connect the second flywheel mass with an associated gearbox (not shown).

Under normal drive conditions and over-run conditions the twin mass flywheel 2010 as a whole rotates in a clockwise direction in the view shown in FIG. 14 as indicated by arrow X about axis Y.

The flywheel mass 2011 comprises the split central hub 2014,2014a an input plate 2015, cover plate 2013 and a starter ring 2027 which is welded to the input plate 2015. Cover plate 2013 is secured at its outer periphery to input plate 2015. Input plate 2015 is fixed between the split hub 2014,2014a by screws 2016 prior to assembly onto the engine, and then following assembly also by the bolts 2018.

The second flywheel mass 2012 comprises an output plate 2020 and a driven plate 2040 fixed rotationally fast with the output plate 2020 via rivets 2044.

The flywheel masses can rotate relative to each other by the provision of bearing arrangement 2090.

Three circumferentially equispaced bob weight arrangements 2049 are located between driven plate 2040 and output plate 2020.

Each bob weight arrangement 2049 comprises a mass 2050 which is pivotally connected via outer pivots 2072 at circumferentially spaced locations to the ends of each of two links 2070. Each link is in the form of a pair of arms 2071. The other end of each link is pivotally connected via inner pivots 2073 at a radially inner position to the driven plate 2040 at circumferentially spaced locations. Thus the radially outer pivots 2072 are constrained to move in an arc relative to their respective inner pivots 2073.

Figure 16:
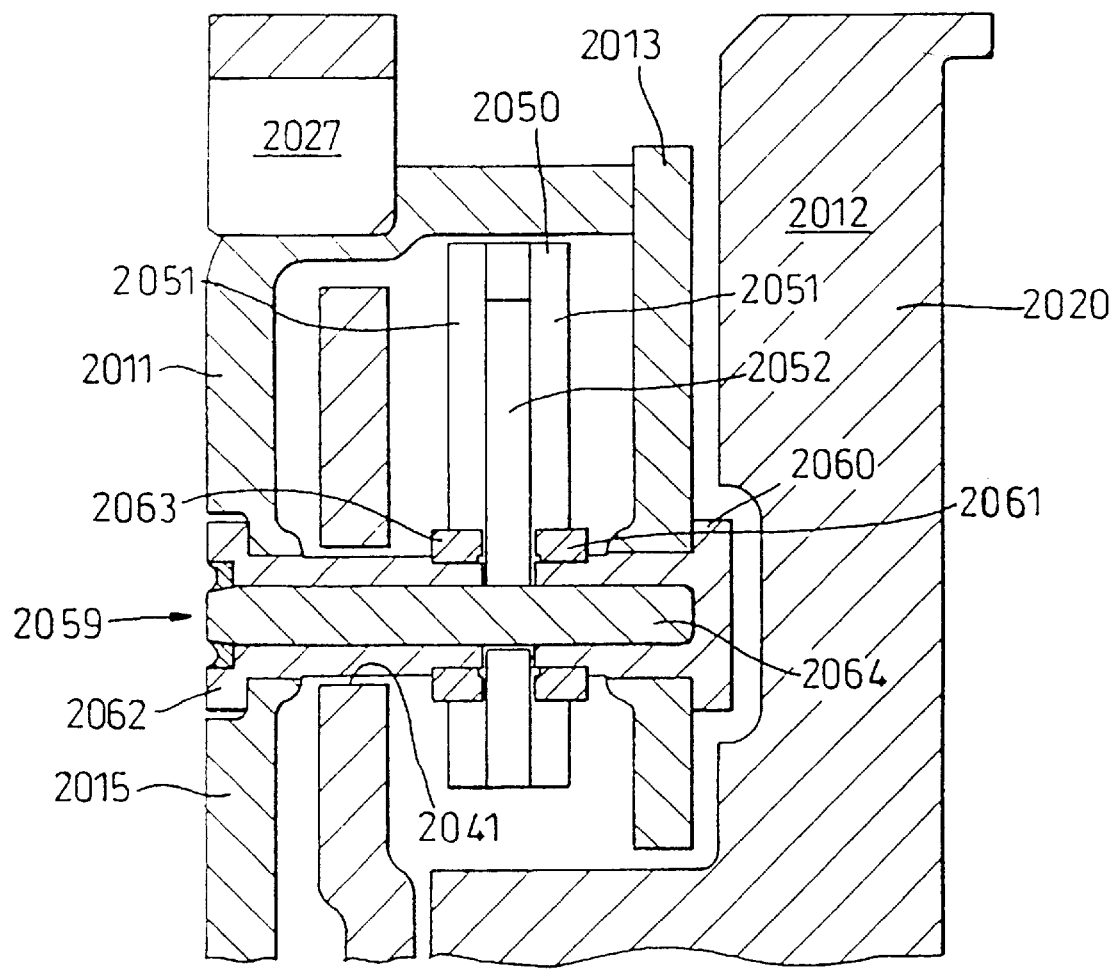
FIG. 16 is a part sectional view taken along the line 16—16 of FIG. 14.

Each mass 2050 is generally circumferentially elongated when viewed in FIG. 14 and generally flat when viewed in FIG. 15 and has an associated pin and roller arrangement 2059. Each mass 2050 has a pair of radially orientated grooves 2051 one groove in each generally flat side. Each mass 2050 has a slot 2052 which connects each pair of grooves 2051. A hollow pin 2060 projects from cover plate 2013 into one of the grooves and has a roller 2061 located on its end (see FIG. 16). A similar but longer hollow pin 2062 projects from input plate 2015, through a circumferentially elongated hole 2041 in driven plate 2040 into the other groove of mass 2050. Pin 2062 also has a roller 2063 located on its end. The hollow pins 2060 and 2062 are concentric and thus allow a strengthening pin 2064 to pass through pin 2062, through the slot 2052 and into pin 2060. Strengthening pin 2064 is welded to pin 2062. It is clear that this arrangement allows the mass 2050 to move radially relative to pins 2060, 2062 and 2064 (and hence radially relative to flywheel mass 2011) but does not allow any circumferential movement of mass 2050 relative to flywheel mass 2011.

Relative rotation of the flywheel masses 2011 and 2012 from the neutral position (as shown in FIG. 14) will cause the outer pivots 2072 to move about appropriate arcs as dictated by their corresponding links 2070. This causes each mass 2050 to move radially inwards.

Thus the inner pivots 2073 (rotationally fast with the output flywheel 2012) move circumferentially relative to outer pivots 2072 (which are rotationally fast with the input flywheel 2011 via mass 2050 and pin and roller arrangement 2059)

From a functional point of view the bob weight arrangement 2049 is very similar to the arrangement shown in FIG. 11.

Helical springs 2080, elastomeric springs 2081 and stops 2082 are carried by the input flywheel and progressively increase the resistance to relative rotation of the flywheel masses 2011 and 2012 in a drive or over-run direction as driven plate 2040 progressively comes into contact with the spring shoe 2080A spring shoe 2081A and stops 2082.

Figure 17:
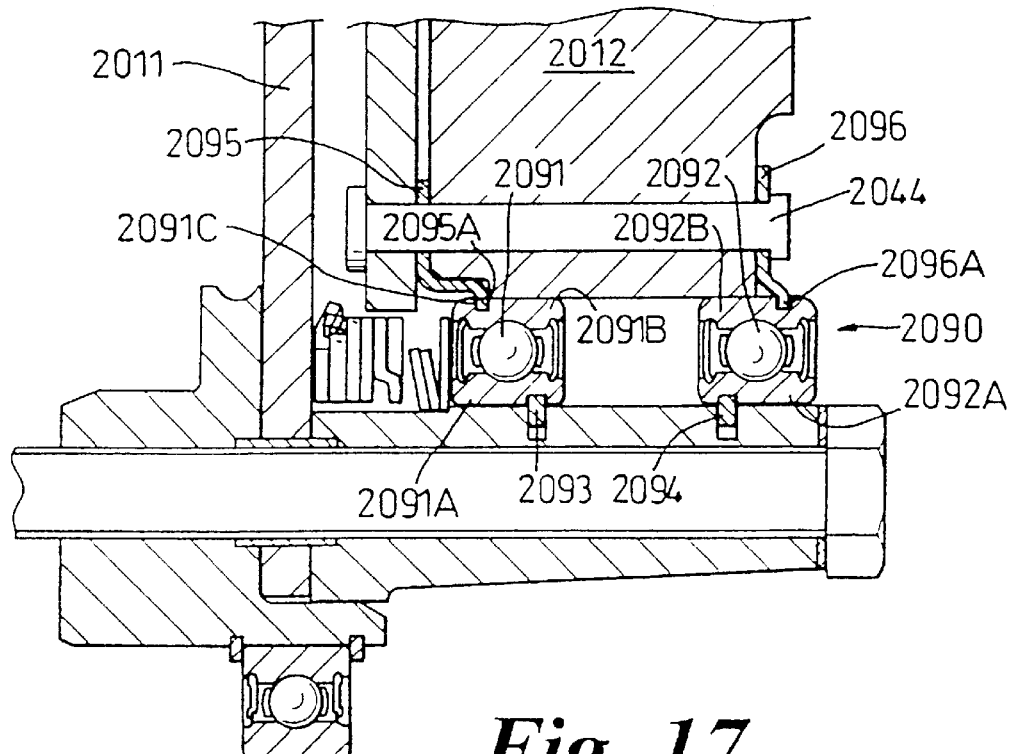
FIG. 17 is an enlarged partial section view of the bearing arrangement of FIG. 15.

Bearing arrangement 2090 (see FIG. 17) comprises two ball bearings 2091 and 2092 positioned at axially spaced locations. The inner race 2091A, 2092A of each bearing is axially located by a snap ring (circlip) 2093, 2094. The outer race 2091B, 2092B of each bearing is located by a plate 2095, 2096. Plate 2095 is generally annular in shape and is secured to hub 2014 by rivets 2044. Plate 2095 has three circumferentially separated arcuate radially inner portions 2095A (only one shown) (all of which are axially displaced from the main annular portion of the plate 2095) and which can be snapped into the groove 2091C of bearing outer race 2091B to secure the bearing 2091 axially relative to the flywheel mass 2012. Plate 2096 is similar to plate 2095 but has a smaller axial displacement of inner portions 2096A.

From a functional point of view each bearing and associated plates and snap rings are very similar to the arrangement shown in FIG. 2 of the Applicant's co-pending international patent application PCT/GB98/00940.

Figure 18:
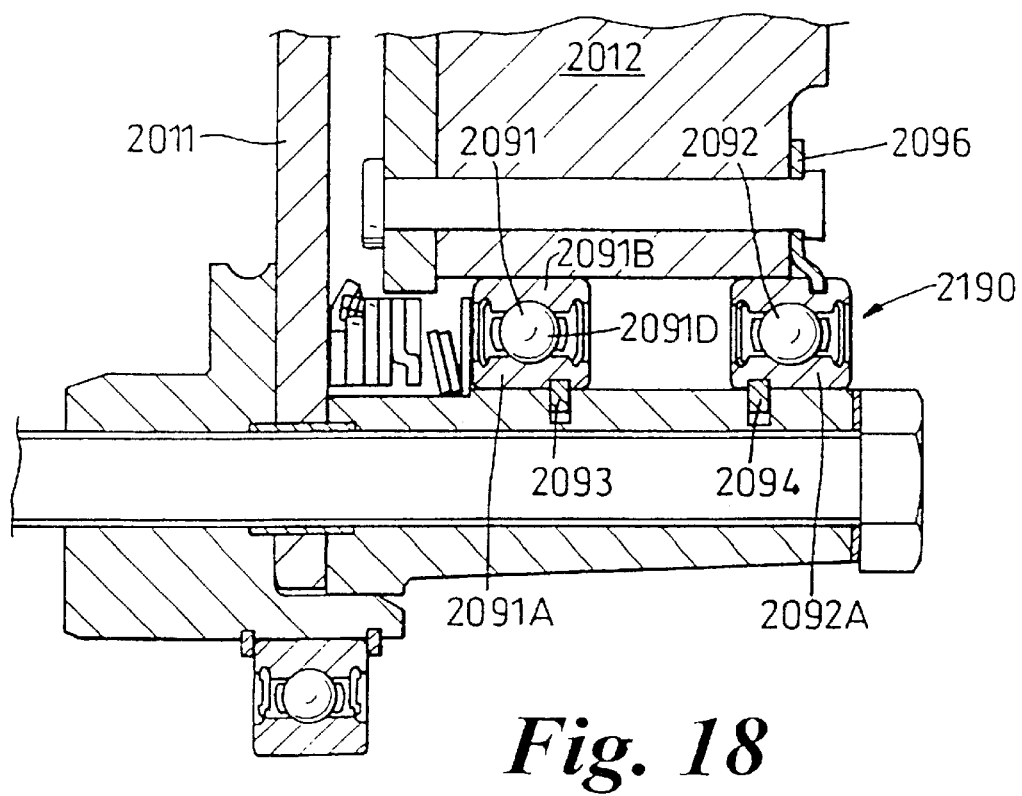
FIG. 18 is a partial sectional view of a modified form of the bearing arrangement of FIG. 17, and FIGS. 19 and 20 show diagrammatically parts of two twin mass flywheels in accordance with the present invention which include planetary gearing between the flywheel masses.

In a further simplification any one of snap rings 2093 or 2094 or plates 2095 or 2096 could be deleted and the axial location of the flywheel masses 2011 and 2012 and bearings 2091 and 2092 would still be ensured. For example in the bearing arrangement 2190 of FIG. 18 the plate 2095 is absent but the axial location of flywheel mass 2011 relative to flywheel mass 2012 is still ensured by bearing 2092, plate 2096 and snap ring 2094. The axial location of bearing 2091 is ensured by snap ring 2093. The axial location of bearing outer race 2091B being ensured by the balls 2091D.

It will be readily apparent to those skilled in the art that, for example, twin mass flywheels 10, 710 and 1010 described above are of the type in which the centre of gravity of the or each connection means moves circumferentially to a greater extent relative to the input flywheel mass than the output flywheel mass which results in an input flywheel with a substantially fixed rotational inertia and an output flywheel with a variable rotational inertia and this can be advantageous in some circumstances.

The twin mass flywheels 110, 210, 310, 510, 610, 810, 910 and 2010, for example, can be similarly converted to the above type if the flywheels 111, 211, 311 etc are connected to a transmission and the flywheels 112, 212, 312, etc are connected to an engine by suitable modification.

Similarly, the twin mass flywheels shown in the Applicant's earlier patent GB 2229793B can be converted to the above type if, for example, the flywheel mass 1 of FIG. 1 is connected to a transmission and the flywheel mass 2 is connected to an engine by suitable modification. Also the twin mass flywheels shown in the Applicant's earlier co-pending PCT patent application No. PCT/GB97/00361 can be similarly converted if the flywheel masses 11, 111, 211 etc are connected to a transmission and the flywheel masses 12, 112, 212 etc are connected to an engine by suitable modification.

As will be appreciated from the above, all the various embodiments of the invention in effect provide a torsional vibration damper for damping such vibrations in a vehicle driveline. If the invention is used solely as a torsional vibration damper the mass of the input and output flywheel masses 11 and 12 can be drastically reduced so that these components become in effect simple input and output members of the device which are, for example, of a relatively light pressed metal construction. The claims of this application should therefore be construed accordingly as covering such a torsional vibration damper with relatively light input and output members 11 and 12.

What is claimed is:

1. A twin mass flywheel comprising a first flywheel mass in connection with an engine and including a first track which extends generally circumferentially part way around the first flywheel mass and a second flywheel mass in connection with a transmission and including a second track extending at an angle relative to the first track, the masses being rotatable relative to each other about an axis through a limited angle and this relative rotation being controlled by connection means which engages with and moves along the first and second tracks and whose center of gravity moves radially with respect to the axis as the first and second flywheel masses rotate relative to each other, the centripetal loads acting on the connection means as the twin mass flywheel rotates tending to reverse said relative rotation of the masses to restore the masses towards a predetermined relative rotational zone thus damping torsional vibrations between the engine and transmission.

2. A twin mass flywheel as defined in claim 1 in which the predetermined relative rotational zone is a predetermined relative rotational position.

3. A twin mass flywheel as defined in claim 1 in which the first and second flywheels include a plurality of circumferentially spaced pairs of first and second tracks, each pair or tracks being connected by its own respective connection means.

4. A twin mass flywheel as defined in claim 1 in which the profile of the second track is different to the profile of the first track.

5. A twin mass flywheel as defined in claim 1 in which one of the first and second tracks extends generally circumferentially and the other of the first and second tracks extends generally radially.

6. A twin mass flywheel as defined in claim 1 in which the profile of that part at least one of the first and second tracks contacted by the connection means in the over-run direction is different from the profile of that part of the track contacted by the mass in the drive direction.

7. A twin mass flywheel as defined in claim 1 in which the radial inward movement of the center of gravity of the connection means per degree of relative rotation of the flywheel masses is greater as the flywheel masses approach the limit of relative rotation in a drive or over-run direction than at a central position.

8. A twin mass flywheel as defined in claim 1 in which the configuration of the first and second tracks allows more relative rotation of the masses in the drive direction than the over-run direction.

9. A twin mass flywheel as defined in claim 1 in which each first or second track is contacted by the connection means at more than one point.

10. A twin mass flywheel as defined in claim 1 in which the connection means engages the first and second tracks by a toothed connection.

11. A twin mass flywheel as defined in claim 10 in which the connection means comprises a gear wheel whose teeth roll around first and second toothed tracks, the center of gravity of the gear wheel being offset from its rolling center.

12. A twin mass flywheel as defined in claim 11 in which the two mass are also connected by one or more toothed quadrants which are pivoted on one mass and have a toothed edge which engages one of the first or second toothed tracks on the other mass.

13. A twin mass flywheel as defined in claim 1 in which the center of gravity of each connection means moves circumferentially to a greater extent relative to one flywheel mass than the other flywheel mass.

14. A twin mass flywheel as defined in claims 1 in which the or each track has a corresponding guide surface to ensure continuous contact between the connection means and the track during relative rotational movement of the first and second flywheel masses.

15. A twin mass flywheel as defined in claim 1 in which the connection means slides along at least one of the tracks during relative rotational movement of the first and second flywheel masses.

16. A twin mass flywheel as defined in claim 15 in which the frictional force generated as the connection means slides along the track varies ion proportion to the torque being transmitted by the flywheel.

17. A twin mass flywheel as defined in claim 1 in which relative rotation of the flywheel masses is also resisted by resilient friction means which act between the flywheel masses.

18. A twin mass flywheel as defined in claim 1 in which relative rotation of the flywheel masses is also resisted by a friction means which acts between the flywheel masses.

* * * * *